US 7,761,850 B2

(12) United States Patent
Kilian-Kehr

(10) Patent No.: US 7,761,850 B2
(45) Date of Patent: Jul. 20, 2010

(54) ITEMS ON WORKPLACES

(75) Inventor: Roger Kilian-Kehr, Darmstadt (DE)

(73) Assignee: SAP AG, Walldorf (DE)

(*) Notice: Subject to any disclaimer, the term of this patent is extended or adjusted under 35 U.S.C. 154(b) by 44 days.

(21) Appl. No.: 11/318,359

(22) Filed: Dec. 22, 2005

(65) Prior Publication Data

US 2007/0150490 A1 Jun. 28, 2007

(51) Int. Cl.
*G06F 9/44* (2006.01)
(52) U.S. Cl. .................. 717/120; 717/104; 717/121; 707/705
(58) Field of Classification Search .......... 707/1; 717/120, 121, 130, 104
See application file for complete search history.

(56) References Cited

U.S. PATENT DOCUMENTS

| | | | |
|---|---|---|---|
| 5,550,971 A * | 8/1996 | Brunner et al. ............. 707/3 |
| 6,215,489 B1 * | 4/2001 | Kaplan .................... 379/258 |
| 6,374,252 B1 * | 4/2002 | Althoff et al. ............. 707/102 |
| 6,529,909 B1 * | 3/2003 | Bowman-Amuah ......... 707/10 |
| 6,594,672 B1 * | 7/2003 | Lampson et al. ........ 707/103 R |
| 6,636,250 B1 * | 10/2003 | Gasser .................... 715/853 |
| 6,662,237 B1 * | 12/2003 | Leckie ..................... 719/320 |
| 6,678,882 B1 * | 1/2004 | Hurley et al. ............. 717/121 |
| 6,968,340 B1 * | 11/2005 | Knowles ................... 707/102 |
| 7,278,097 B1 * | 10/2007 | Tanizaki et al. ........... 715/205 |
| 7,293,254 B2 * | 11/2007 | Bloesch et al. ............. 717/108 |
| 7,334,216 B2 * | 2/2008 | Molina-Moreno et al. .. 717/109 |
| 7,577,934 B2 * | 8/2009 | Anonsen et al. ............ 717/102 |
| 2003/0079047 A1 * | 4/2003 | Fitts et al. ................. 709/310 |
| 2003/0149552 A1 * | 8/2003 | Srinivasa ................... 703/2 |
| 2004/0015858 A1 * | 1/2004 | Seto et al. ................. 717/120 |
| 2004/0056896 A1 * | 3/2004 | Doblmayr et al. .......... 345/769 |
| 2004/0111464 A1 * | 6/2004 | Ho et al. ................... 709/203 |
| 2004/0148586 A1 * | 7/2004 | Gilboa ..................... 717/108 |
| 2004/0153992 A1 * | 8/2004 | Molina-Moreno et al. .. 717/105 |
| 2004/0210445 A1 * | 10/2004 | Veronese et al. ............ 705/1 |
| 2004/0220956 A1 * | 11/2004 | Dillon ...................... 707/101 |
| 2005/0005261 A1 * | 1/2005 | Severin .................... 717/108 |
| 2005/0010899 A1 * | 1/2005 | Kung et al. ................ 717/108 |
| 2005/0066338 A1 * | 3/2005 | Bloesch et al. ............. 719/328 |
| 2005/0076311 A1 * | 4/2005 | Kusterer et al. ............ 715/853 |
| 2005/0091249 A1 * | 4/2005 | Hanson et al. ............. 707/101 |

(Continued)

OTHER PUBLICATIONS

Singh et al., "Modelling Software Artifacts and Their Relationships in Software Engineering Environments", 1996, pp. 1-14, accessed online at <http://citeseer.ist.psu.edu/113414.html> on May 23, 2008.*

(Continued)

*Primary Examiner*—Charles Rones
*Assistant Examiner*—Phuong-Thao Cao
(74) *Attorney, Agent, or Firm*—Schwegman, Lundberg & Woessner, P.A.

(57) ABSTRACT

This document discusses, among other things, a system and a method for using a meta-model to manage relationships between software artifacts, the method comprising determining a meta-model; identifying one or more available artifacts in one or more software applications; using the meta-model to define one or more relationships between the one or more available artifacts, wherein each relationship is a specific instance of a possible association defined in the meta-model; and providing the one or more relationships as one or more configurations to the one or more software applications.

23 Claims, 6 Drawing Sheets

U.S. PATENT DOCUMENTS

| | | | |
|---|---|---|---|
| 2005/0108684 A1* | 5/2005 | Sohn et al. | 717/120 |
| 2005/0144598 A1* | 6/2005 | Sabadell et al. | 717/137 |
| 2005/0188347 A1* | 8/2005 | Dorn et al. | 717/104 |
| 2005/0235250 A1* | 10/2005 | Rajagopal et al. | 717/104 |
| 2006/0004848 A1* | 1/2006 | Williams et al. | 707/103 R |
| 2006/0026552 A1* | 2/2006 | Mazzitelli et al. | 717/101 |
| 2006/0179116 A1* | 8/2006 | Speeter et al. | 709/217 |
| 2006/0195460 A1* | 8/2006 | Nori et al. | 707/100 |
| 2006/0230066 A1* | 10/2006 | Kosov et al. | 707/104.1 |
| 2006/0277089 A1* | 12/2006 | Hubbard et al. | 705/9 |
| 2007/0055936 A1* | 3/2007 | Dhanjal et al. | 715/700 |
| 2007/0055972 A1* | 3/2007 | Brown et al. | 717/174 |
| 2007/0245257 A1* | 10/2007 | Chan et al. | 715/769 |

OTHER PUBLICATIONS

Keith Short, "Modeling Languages for Distributed Applications", Oct. 2003, pp. 1-10, accessed online at <http://msdn.microsoft.com/en-us/library/aa302173.aspx> on Jul. 1, 2009.*

Hayashi et al., "Combining UML, XML and relational database technologies—the best of all worlds for robust linguistic databases", 2001, pp. 1-10, accessed online at <http://xml.coverpages.org/HayashiUML-XML.pdf> on Jul. 1, 2009.*

Gokhale et al., "Applying Model-Integrated Computing to Component Middleware and Enterprise Applications", 2002, pp. 1-6, accessed online at <http://www.cs.wustl.edu/—schmidt/PDF/CACM02.pdf> on Jul. 1, 2009.*

Talevski et al., "Meta Model Driven Framework for the Integration and Extension of Application Components", IEEE, 2004, pp. 1-7, accessed online at <http://ieeexplore.ieee.org/xpls/abs_all.jsp?arnumber=1410971> on Jul. 1, 2009.*

Bellettini et al., "WebUML: Reverse Engineering of Web Applications", ACM 2004, pp. 1662-1669, accessed online at <http://portal.acm.org/citation.cfm?id=968231> on Jul. 1, 2009.*

Breton et al., "Using Meta-Model Technologies to Organize Functionalities for Active System Schemes", 2001, pp. 1-3, accessed online at <http://ftp.informatik.rwth-aachen.de/Publications/CEUR-WS/Vol-52/oas01-breton.pdf> on Feb. 18, 2010.*

Jean et al., "Using a meta-model to build a connection service in an object oriented application development environment", AMIA 1994, pp. 483-487, accessed online at <http://www.ncbi.nlm.nih.gov/pmc/articles/PMC2247906/pdf/procascamc00001-0482.pdf> on Feb. 18, 2010.*

OMG, "Meta Object Facility (MOF) Specification Reference v.1.4", (Apr. 3, 2002),358 pgs.

OMG, "Unified Modeling Language Specification version 1.5", (Mar. 2003),736 pgs.

OMG, "XML Metadata Interchange (XML) Specification v.1.2", (Jan. 1, 2002),268 pgs.

* cited by examiner

ITEMS ON WORKPLACES

TECHNICAL FIELD

This patent document pertains generally to software management, and more particularly, but not by way of limitation, to the relating of items on workplaces.

BACKGROUND

In the electronic age, computers have become a common appliance. This is most evident in the business world where daily activities include using word processors and spreadsheet programs to create documents; using email and fax programs to communicate from the computer desktop; and using database tools to manage personal contacts and company resources and assets. Typically, a wide array of disparate software programs are used to create and manage the various documents and other objects (e.g., contacts, to-do items, company assets). For example, personal contacts and communication are managed in personal information management (PIM) applications while enterprise resources are managed in enterprise resource planning (ERP) systems. Initially, the programs that handled these tasks were limited, however, in recent years, integrated applications have become popular. A typical example of an integrated PIM is Microsoft Outlook, produced by Microsoft Corporation of Redmond, Wash. Outlook integrates an email client, a calendar, a task manager, and an address book. By grouping several functional areas under one common program umbrella, Microsoft is able to provide relationships between different objects within Outlook. For example, when creating an email, to quickly find an email address, a user can access their address book to obtain a list of personal contacts. This relationship, among others, is hard-coded into the software application. However, typically, the number and types of relationships are fixed, which leaves a user two choices, to either work within the application's constraints or find a different application. To improve workplace efficiency and program usability, it is desirable to provide a system that allows a user to define dynamic relationships between discrete objects within one software program or among several programs.

SUMMARY

This document describes, among other things, systems and methods for using a meta-model to manage relationships between different software objects, also referred to as artifacts. Typically, software artifacts include items such as a contact, a task item, an email, a calendar entry, a document, and enterprise resources such as employees, orders, organizational data, materials, customers, and assets. In general, a software artifact may be any object that is created or managed using software.

According to one example there is a method for creating and maintaining relationships between software applications, the method comprising determining a meta-model; identifying one or more available artifacts in one or more software applications; using the meta-model to define one or more relationships between the one or more available artifacts, wherein each relationship is a specific instance of a possible association defined in the meta-model; and providing the one or more relationships as one or more configurations to the one or more software applications.

According to another example there is a system for managing relationships between software applications, the system comprising a processor coupled to a memory; a user-interface coupled to the processor; a gather artifacts module to run on the processor to identify and manage any available artifacts in one or more software applications; a presentation module to run on the processor to use a meta-model and the available artifacts in a modeling environment, wherein the modeling environment is such that a user can interact and manage one or more relationships between the available artifacts using a definition provided by the meta-model; and a configuration output module to run on the processor to provide the one or more relationships as one or more configurations.

This summary is intended to provide an overview of certain subject matter of the present patent application. It is not intended to provide an exclusive or exhaustive explanation of the invention. The detailed description is included to provide further information about the subject matter of the present invention.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show, by way of illustration, specific embodiments in which the invention may be practiced. These embodiments, which are also referred to herein as "examples," are described in enough detail to enable those of ordinary skill in the art to practice the invention. The embodiments may be combined, other embodiments may be utilized, or structural, logical, and electrical changes may be made without departing from the scope of the present invention. The following detailed description is, therefore, not to be taken in a limiting sense, and the scope of the present invention is defined by the appended claims and their equivalents.

In this document, the terms "a" or "an" are used, as is common in patent documents, to include one or more than one. In this document, the term "or" is used to refer to a nonexclusive or, unless otherwise indicated.

Introduction

The present inventor has recognized that static programming has restricted a computer user from obtaining full efficiency and functionality when using software. Among other things, this document describes a flexible and powerful way of defining and maintaining relationships between software artifacts, such as an email file, a contact record, or a task item, to provide more functionality and usability to a typical user.

In particular, in this example, a standardized modeling language is used to manage the relationships between artifacts. The Meta-Object Facility (MOF) is a standardized language that provides a framework for specifying, constructing, and managing meta-models. A meta-model is an abstract representation of some kind of meta-data. The Unified Modeling Language (UML) is one example of a meta-model that can be defined by the MOF meta-metamodel language. Using a meta-modeling language, a system of abstract relationships between software artifacts can be further defined instantiated as a concrete model. In certain examples, the meta-modeling language is UML. In other examples, any concrete meta-model expressed as an instance of the MOF could be used to define the space. Using a model editor in conjunction with a meta-model, a user can centrally manage relationships between various software artifacts. In this detailed description, a networked environment is described; however, similar systems and methods could be used in stand-alone environments.

Figure 1:
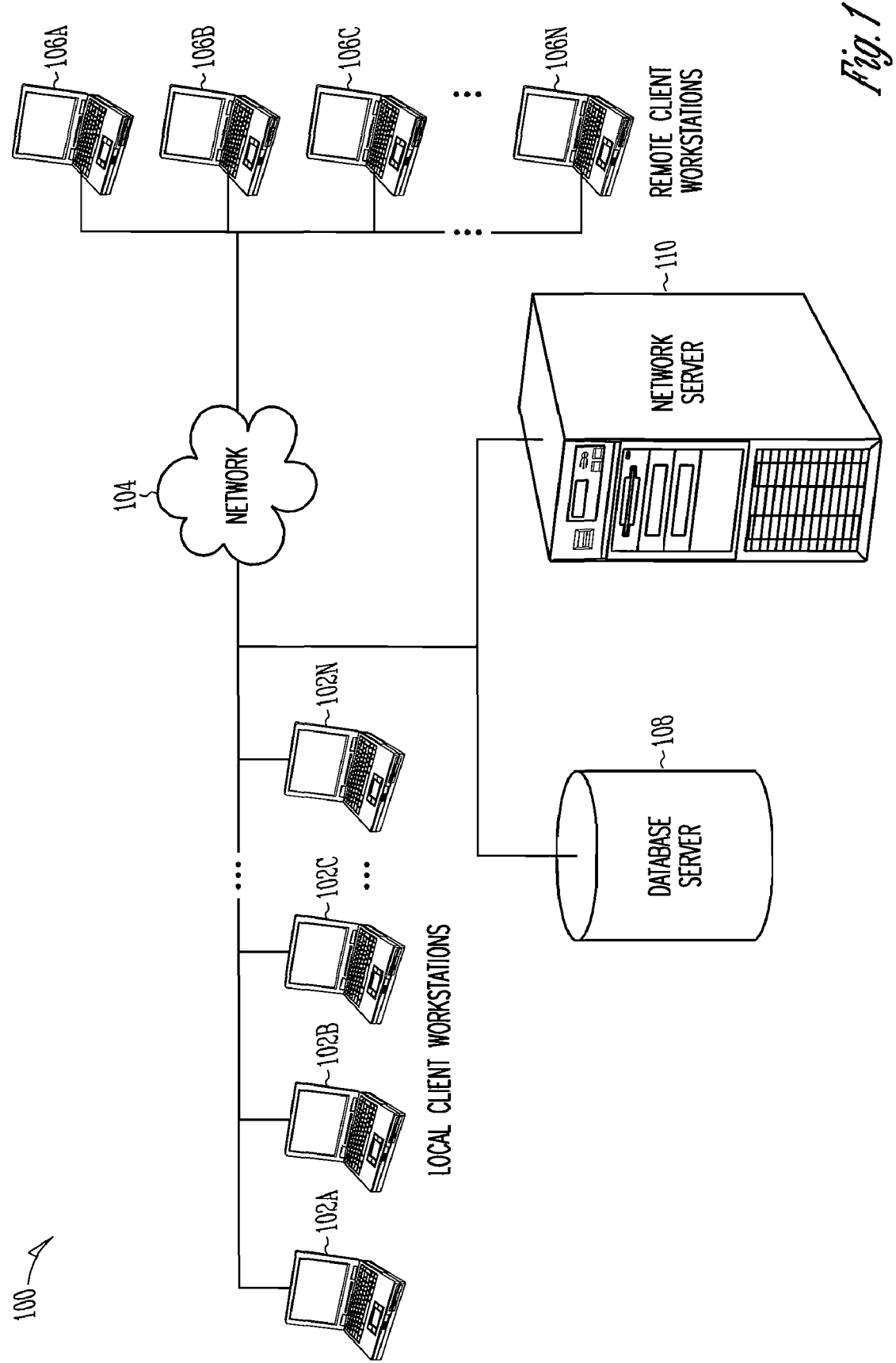
FIG. 1 is a schematic view of a networked computer system

FIG. 1 illustrates an example of a networked environment 100. A group of local computer workstations 102A, 102B, 102C, . . . , 102N are connected in a local area network (LAN). In this example, the LAN is connected to an external network 104, which could be the Internet, a satellite connection, or other wireless networks. In addition, a wide area network (WAN) is provided with a group of remote computer workstations 106A, 106B, 106C, . . . , 106N connected to the external network 104. The LAN is also connected to a database server 108 and a network server 110. In certain examples, the network server 110 includes one or more groupware applications (e.g., Microsoft Exchange, Lotus Domino). One or more local client workstations 102 or remote client workstations 106 are able to connect to the network server 110 to use the one or more groupware applications. In certain examples, a database server 108 includes one or more database management systems (DBMS) (e.g., Microsoft SQL Server, Oracle), which are used to enable the systems and methods described below.

EXAMPLES

Figure 2:
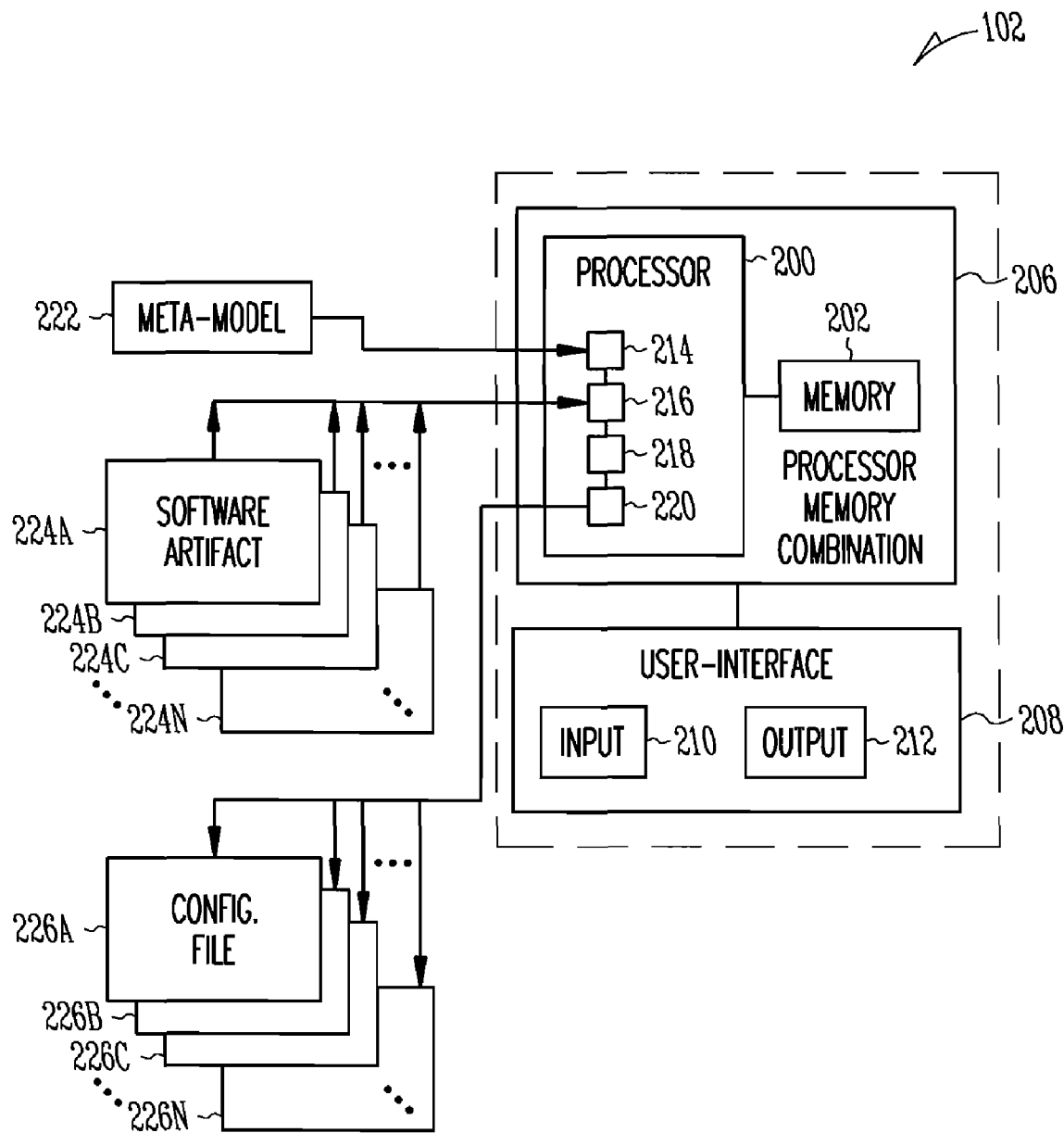
FIG. 2 is a schematic view of a system used to manage relationships between software artifacts.

FIG. 2 illustrates portions of a system 102 that is capable of managing relationships between different desktop software components. In this example, the workstation 102 illustrated in FIG. 2 is located on the LAN. However, the systems and methods described could be executed by any computer on the network, including remote workstations 106 that are on the WAN, as shown in FIG. 1.

In this example, a processor 200 is connected to interact with a memory 202. A wide array of possible processor and memory combinations are available. The processor 200 may include commercial units (e.g. Pentium, Motorola 68000 series, PowerPC) or specialized units made for use in specific applications. The memory 202 can include any conventional memory, such as solid-state, magnetic, or optical media.

A user-interface 208 is typically connected to the processor-memory combination 206. This user-interface 208 typically includes an input device 210 and an output device 212. The input device 210 can be one or more of a keyboard, a mouse, a touchpad, a microphone, a sensing device, a monitoring device, or any other type of device that allows a computer to receive commands and input data from a user. The output device 212 can include such things as a monitor, a printer, a speaker, or any other type of device that allows a system to represent resultant data to the user.

In one example, a user can input a command with an input device 210 that initiates execution of a method that manages relationships between software components on the processor-memory combination 206. First, a meta-model 222 is read by the Meta-Model Reader module 214. Then, any available software artifacts 224A, 224B, 224C, . . . , 224N are identified by the Gather Artifacts module 216. The Presentation module 218 interacts with the user-interface 208 to allow the user to manage the relationships. Then, one or more configuration files 226A, 226B, 226C, . . . , 226N are generated from the changes made by the user and saved in the Configuration Output module 220. Then, in one example, the results are displayed on the output device 212 for the user.

Figure 3:
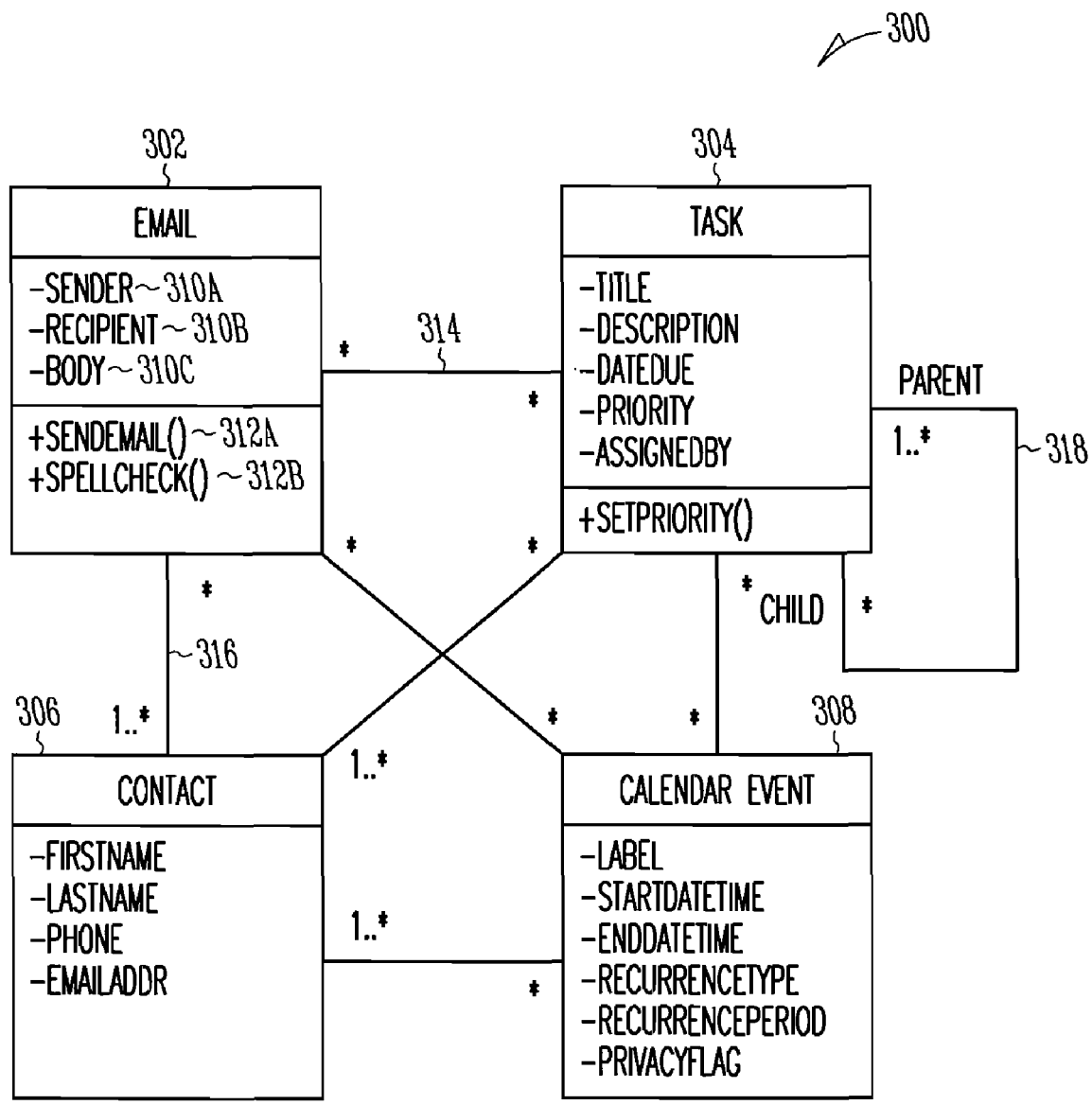
FIG. 3 is a schematic view of an exemplary meta-model

FIG. 3 is a schematic view of an exemplary model 300. In this example, the model 300 is a concrete model using the conventional UML meta-model. In general, a model 300 will describe relationships between software artifacts, such as an email file, a task item, orders, materials, personnel records, or a resource (e.g., a conference room, an image projector, a computer station). Typically, artifacts include any item that may be managed by an enterprise resource planning (ERP) system. In some examples, the software artifacts are exposed as classes. This may allow relationships at the elemental level within the class. For example, a relationship could be defined between a task item "description" field and an email file, such that only the description would be available for use in the email file within the software. In other examples, only abstractions of each software component are represented. So, a user may then only create relationships at the artifact-level, for example, between a contact and a calendar entry.

Referring to FIG. 3, four classes are shown: an Email class 302, a Task class 304, a Contact class 306, and a Calendar Event class 308. Typically, each class may include attributes, operations, and exceptions, along with other characteristics as defined by the UML Specification. In this example, the Email class 302 has several attributes 310A, 310B, 310C and two operations 312A, 312B. Similarly, other classes in the model have defined attributes and operations.

FIG. 3 also illustrates the current associations between the exemplary classes. The association 314 between the Email class and the Task class is partially defined by the multiplicity. The multiplicity indicates the allowable upper and lower range of relatable classes. In this example, as indicated by the asterisks on each end of the association 314, the Email class 302 has a many to many association with the Task class 304. In other words, an instance of the Email class 302 may be associated with zero or more instances of the Task class 304 and vice versa. In contrast, in this example, as defined by the association 316 between the Email class 302 and the Contact class 306, an instance of the Email class 302 must be associated with at least one instance of the Contact class 306. In the other direction of the association 316, an instance of the Contact class 306 may be associated with zero or more instances of the Email class 302. Finally, in this example, a recursive association 318 relates the Task class to itself such that a parent instance of the Task class 304 can have zero or more associated child tasks and a child instance of the Task class 304 must have at least one parent instance associated with it. While entity-to-entity associations are typically available in meta-models, the existence of recursive associations is dependent on the meta-model in use.

Figure 4:
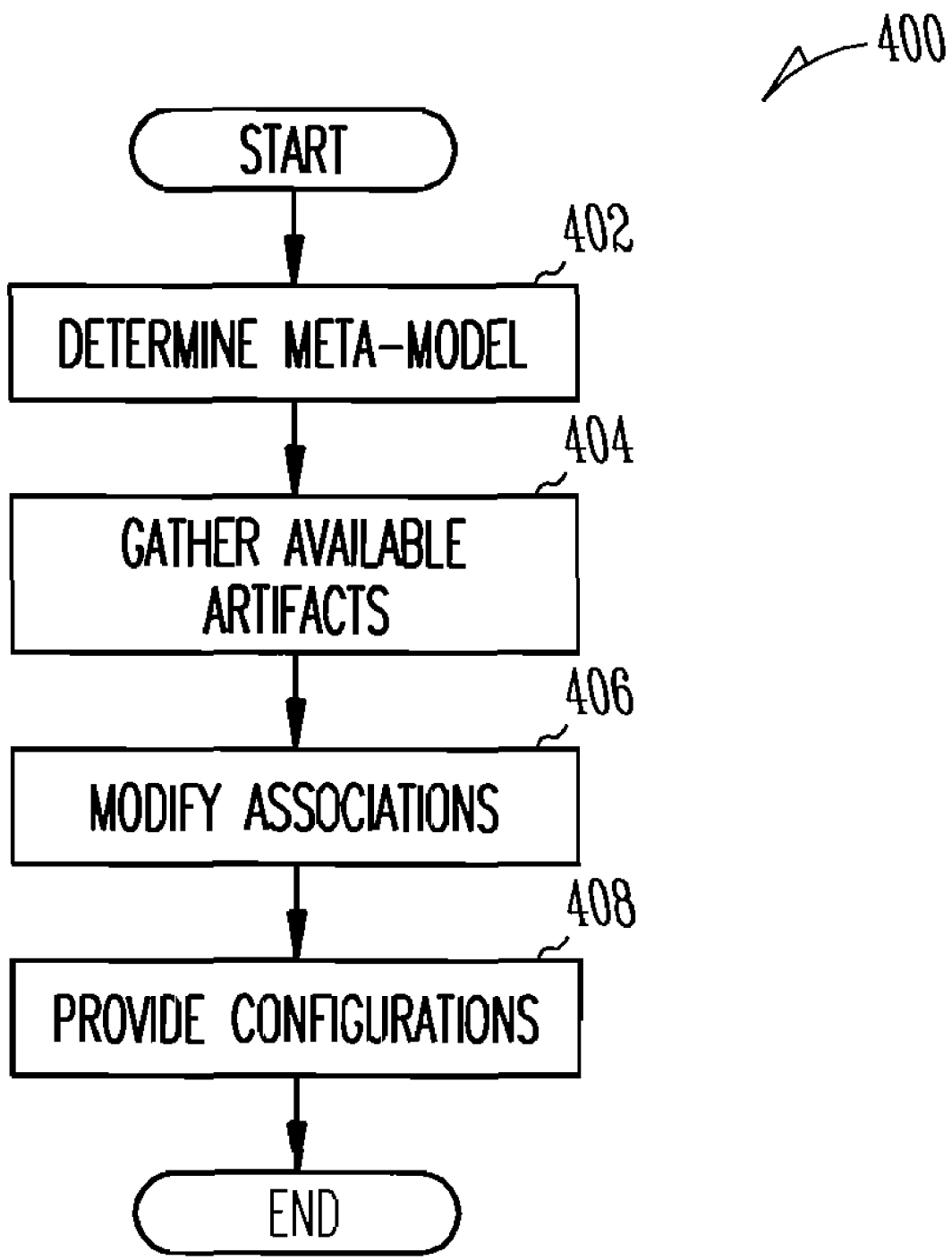
FIG. 4 is a flowchart illustrating generally a method of managing relationships between software artifacts

FIG. 4 is a flowchart illustrating generally a method 400 of managing relationships between software artifacts. At 402, the method 400 determines a defined meta-model to be used. In certain examples, the defined meta-model is UML. In other examples, a meta-model is generated for the specific use of managing relationships between software artifacts in a desktop environment. In this example, a meta-model is assumed to have been defined and in specific, the meta-model used is a contemporary version of UML.

At 404, available artifacts provided by one or more software applications are gathered and organized. In certain examples, the software application that exposes each particular software artifact can control which elements (e.g., attribute, operation, exception) of each class are viewable in a model editor. Each software application could use a specific file format to expose their available artifacts, or a standardized format, such as XML (or in the specific form of XMI), could be implemented. In other examples, the model editor may build the detailed view of each class using a central repository, a known specification (e.g., an application programming interface (API)), or some other internally or externally available configuration mechanism.

At 406, associations between available artifacts are created, modified, and deleted. The creation and modification of associations are constrained by the meta-model determined at 402.

At 408, specific associations are provided to the software applications. In one example, the configurations are saved as one or more configuration files. In some examples, a separate configuration file is provided to each participating software application. In certain examples, each configuration file is saved in a standard interface language format such as the XML Metadata Interchange (XMI) standard. In other examples, a global configuration file is available for one or more software applications to access. Alternatively, a global configuration may be stored in a database server 108, as illustrated in FIG. 1, to be accessed by the applications on each of the local client workstations 102 and remote client workstations 106. Alternatively, the configuration of an application is directly communicated to the application itself, e.g., using technologies such as Microsoft's Component Object Model (COM) and Distributed Component Object Model (DCOM), the Object Management Group's Common Object Request Broker Architecture (CORBA), or a Web service technology.

Figure 5:
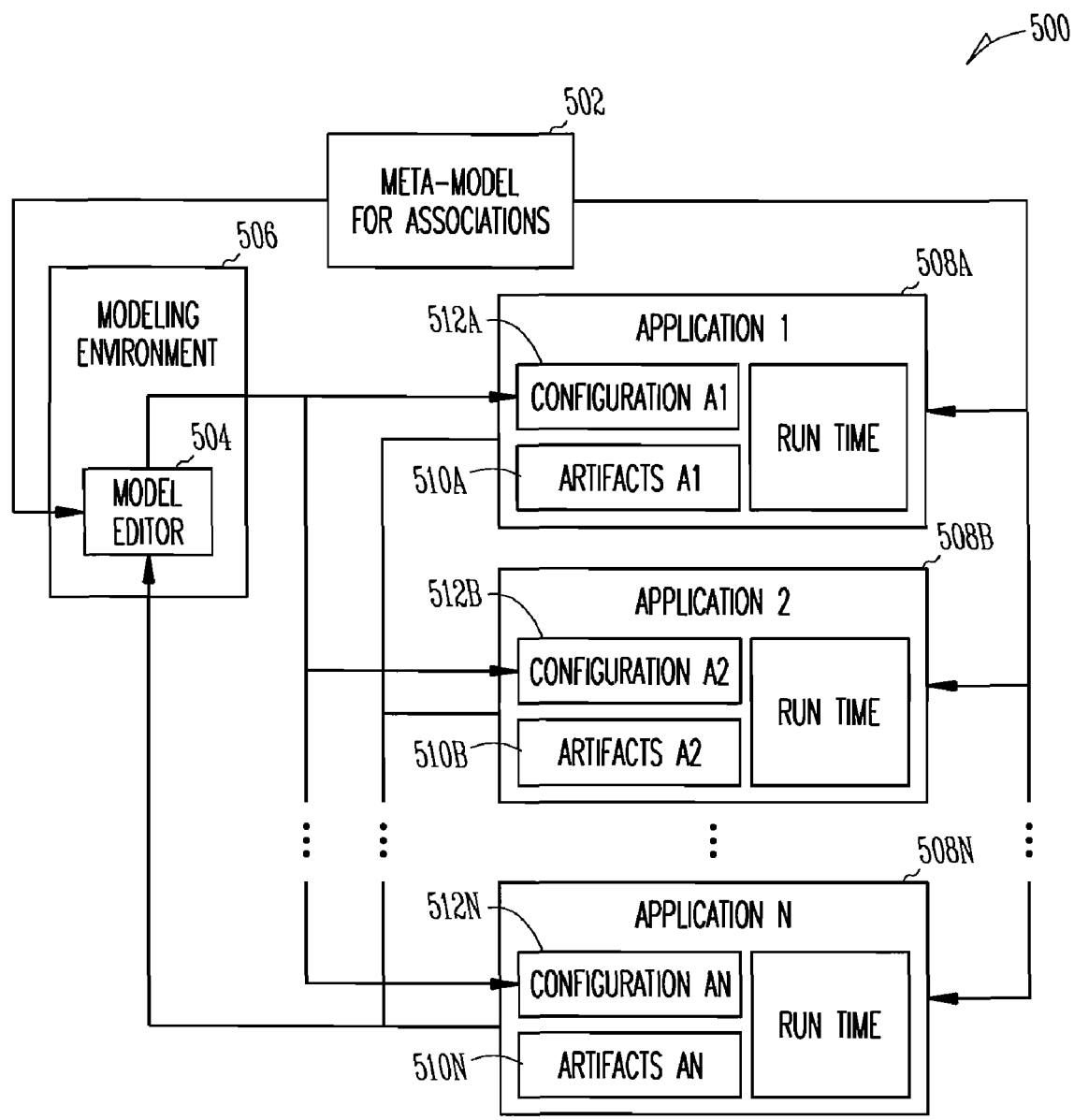
FIG. 5 is a schematic view of a system used to manage relationships between software artifacts

FIG. 5 is a schematic view of a system 500 used to manage relationships between software components. A meta-model 502, such as the UML meta-model, is available to the model editor 504. In certain examples, the model editor 504 exists in a modeling environment 506 (e.g., the SAP ECLIPSE framework). The model editor 504 will typically use the information in a meta-model 502 to properly constrain a user when creating the specific relationships in a concrete model 514, as illustrated in FIG. 3. In some examples, the model editor 504 is configurable and will use the meta-model 502 as input to configure the modeling environment 506 and/or the model editor 504. In other examples, a model editor 504 is built to use a specific meta-model 502.

Based on the meta-model 502, a user can use the model editor 504 and/or the modeling environment 506 to modify associations between available artifacts. In certain examples, the model editor 504 uses a graphical interface and allows the user to create and manage the relationships using a visual programming technique. In some examples, the user can only define associations at a general level of granularity. For example, the user may want to provide a relationship between an email object and a calendar entry object. Using the model editor 504, the user can define a generic relationship, which the specific software application (e.g., Microsoft Outlook) will then interpret and provide a user-interface element that allows a user to manage the certain relationship (e.g., a menu bar command). In other examples, the model editor user can define associations at a finer level of granularity, specifying the exact user-interface that will be available to the desktop application user (e.g., only allowing user to add an email object to a calendar entry object using a context-menu).

The meta-model 502 is also available to one or more software applications 508A, 508B, ..., 508N. These applications 508 use the meta-model 502 to define artifacts 510A, 510B, ..., 510N, which will be exposed to the model editor 504. Any software application that exposes artifacts to a model editor 502 or a modeling environment 506 is assumed to know of the meta-model 502 and provide artifacts 510 that conform to the meta-model 502. The model editor 504 obtains the group of artifacts 510 from the group of applications 508. Using the meta-model 502 to constrain the types of possible associations, such as those illustrated in FIG. 3, a user edits the associations between the artifacts 510 using the model editor 502 and saves a configuration file 512A, 512B, ..., 512N for each application 508. At runtime, each application 508 uses their configuration file 512 to provide methods to manage the associations to a user. For example, to create associations between objects, an application 508 could provide new context-menus, a drag-and-drop ability, new menu items, shortcut keyboard commands, or other user interfaces to enable association/dissociation. Applications 508 could also provide searching or reporting tools to provide alternate displays of related artifacts.

As an illustrative example, a first artifact $A_{art}$ is produced by a first application $A_{app}$ and a second artifact $B_{art}$ is produced by a second application $B_{app}$. The applications have exposed these artifacts to a modeling environment. A model provides for certain relationships between $A_{art}$ and $B_{art}$ and the applications $A_{app}$ and $B_{app}$ are aware of these possible relationships. A user can create an association (a specific instance of a relationship) between $A_{art}$ and $B_{art}$ using methods such as drag-and-drop or drag-and-relate. For example, when the user "drops" $A_{art}$ onto $B_{art}$ there is some information flow (e.g., via DCOM), which sends an identifier or URL of $A_{art}$ to $B_{app}$. $B_{app}$ performs an internal operation that stores the identifier or URL and associates it with $B_{art}$. The user can then access $A_{art}$ by opening $B_{art}$ and by clicking on an icon or link that represents $A_{art}$.

Figure 6:
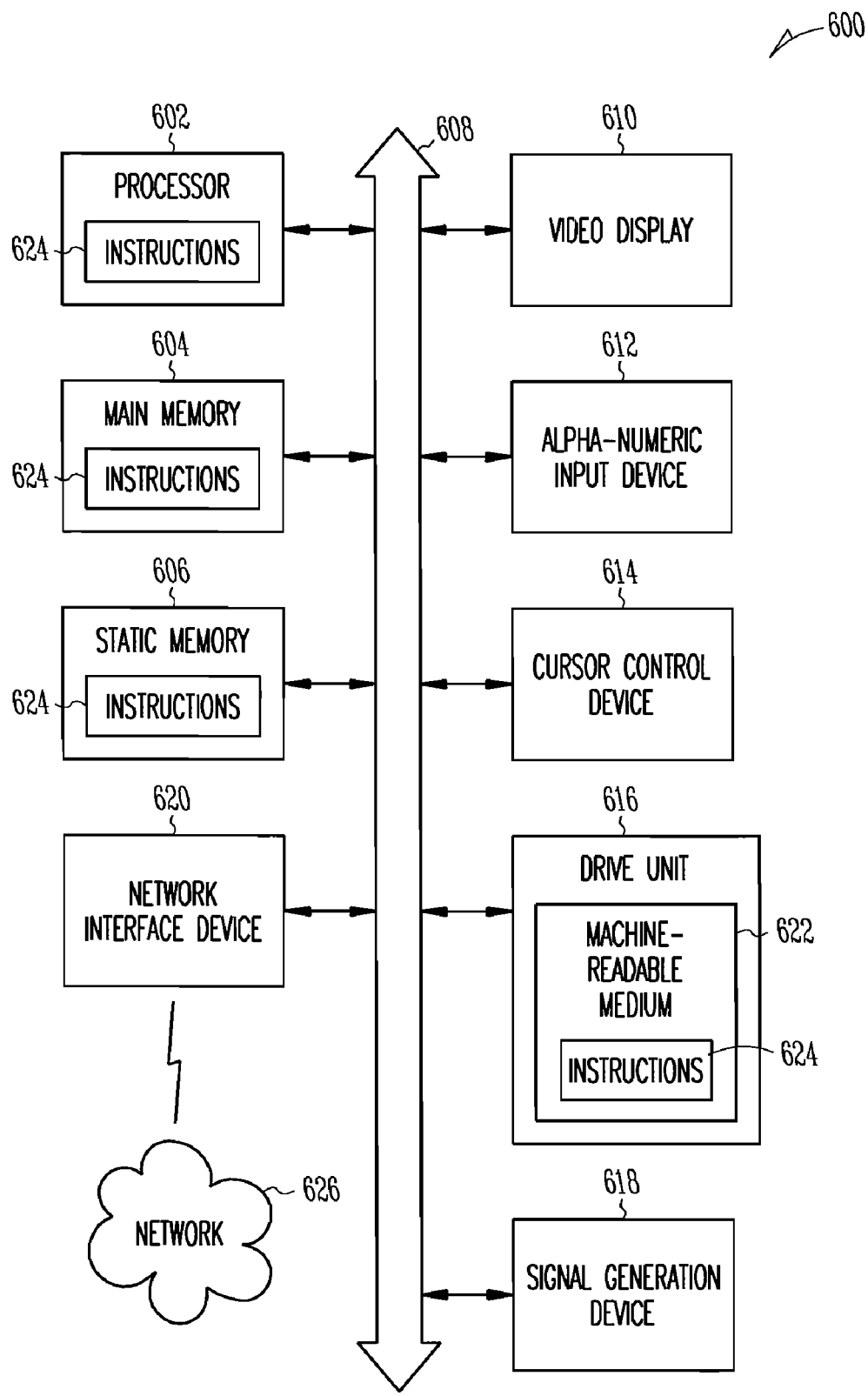
FIG. 6 is a schematic view of a system used to manage relationships between software artifacts.

FIG. 6 shows a diagrammatic representation of a machine in the example form of a computer system 600 within which a set of instructions, for causing the machine to perform any one or more of the methodologies discussed herein, may be executed. In some examples, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a user interface (UI) navigation device 614 (e.g., a mouse), a disk drive unit 616, a signal generation device 618 (e.g., a speaker), and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may further be transmitted or received over a network 626 via the network interface device 620 utilizing any one of a number of transfer protocols (e.g., HTTP).

While the machine-readable medium 622 is shown in an example to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media.

It is to be understood that the above description is intended to be illustrative, and not restrictive. For example, the above-described embodiments (and/or aspects thereof) may be used in combination with each other. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, various features may be grouped together to streamline the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus the following claims are hereby incorporated into the Detailed Description, with each claim standing on its own as a separate embodiment.

What is claimed is:

1. A computer-assisted method for creating and maintaining relationships between software applications, the method comprising:
   determining a meta-model;
   choosing one or more available artifacts to expose, the artifacts being available from a plurality of software applications, the plurality of software applications including a first software application and a second software application;
   modeling the one or more chosen available artifacts using the meta-model;
   receiving the one or more modeled artifacts;
   using the meta-model to define one or more relationships between the one or more modeled artifacts, wherein each relationship comprises a possible association defined in the meta-model, and wherein each relationship defines an aspect of a first artifact accessible via a second artifact where the first and second artifacts are selected from the one or more modeled artifacts, and wherein the first artifact is associated with the first software application and the second artifact is associated with the second software application;
   providing, using one or more computers, the one or more relationships to one or more of the plurality of software applications; and
   defining, during runtime of the first software application, a functional association between a software artifact of a first type corresponding to the first artifact of the modeled artifacts in the meta-model with a software artifact of a second type corresponding to the second artifact of the modeled artifacts in the meta-model using the possible association defined in the meta-model, wherein the software artifact of the first type is associated with the first software application and the software artifact of the second type is associated with the second software application.

2. The method of claim 1, wherein providing the one or more relationships comprises managing one or more configuration files that define the relationships.

3. The method of claim 2, wherein the configuration file uses a standardized interface language.

4. The method of claim 3, wherein the standardized interface language is the XML Metadata Interchange (XMI) standard.

5. The method of claim 1, wherein providing the one or more relationships comprises directly configuring at least one of the software applications using application-to-application communication.

6. The method of claim 1, wherein the meta-model is defined by a standardized modeling language.

7. The method of 6, wherein the standardized modeling language is the Unified Modeling Language (UML).

8. The method of claim 1, wherein the one or more modeled artifacts include a calendar entry, a contact, a task item, an email message, a document, a meeting, an employee, an order, an organizational data, a material, a customer, and an asset.

9. The method of claim 1, wherein the one or more modeled artifacts are represented as one or more classes.

10. The method of claim 9, wherein using the meta-model to define one or more relationships includes creating a relationship between one or more elements of the one or more classes.

11. The method of claim 1, wherein using the meta-model to define one or more relationships includes defining a recursive relationship.

12. The method of claim 1, wherein using the meta-model to define one or more relationships includes defining a mode of managing a relationship in the one or more software applications.

13. The method of claim 12, wherein the mode of managing a relationship includes at least one of:
providing a context-sensitive menu;
providing a drag-and-drop ability;
providing a drag-and-relate ability;
providing a menu command; and
providing a keyboard command.

14. The method of claim 1, wherein the aspect of the first artifact comprises a functional aspect.

15. The method of claim 1, wherein the aspect of the first artifact comprises a descriptive aspect.

16. The method of claim 1, wherein providing the one or more relationships includes storing a globally-accessible configuration for the plurality of software applications in a shared storage device.

17. A system for managing relationships between software applications, the system comprising:
a processor coupled to a memory;
a user-interface coupled to the processor;
a gather artifacts module to run on the processor to identify one or more modeled artifacts provided by a plurality of software applications, the plurality of software applications including a first software application and a second software application, wherein the modeled artifacts include one or more artifacts that exist in the plurality of software applications and that were selectively exposed and then modeled by the plurality of software applications;
a presentation module to run on the processor to use a meta-model and the modeled artifacts in a modeling environment, wherein the modeling environment allows a user to interact and manage one or more relationships between the modeled artifacts using a definition provided by the meta-model, and wherein each relationship defines an aspect of a first artifact accessible via a second artifact where the first and second artifacts are selected from the one or more modeled artifacts, and wherein the first artifact is associated with the first software application and the second artifact is associated with the second software application; and
a configuration output module to run on the processor to provide the one or more relationships as one or more configurations to the first software application, wherein the first software application, defines, during runtime of the first software application, a functional association between a software artifact of a first type corresponding to the first artifact of the modeled artifacts in the meta-model with a software artifact of a second type corresponding to the second artifact of the modeled artifacts in the meta-model using the definition provided by the meta-model, wherein the software artifact of the first type is associated with the first software application and the software artifact of the second type is associated with the second software application.

18. The system of claim 17, comprising a meta-model reader module to run on the processor to read the meta-model.

19. The system of claim 17, wherein the one or more configurations are stored as one or more files on one or more computers.

20. The system of claim 17, wherein the one or more configurations are stored in a database.

21. The system of claim 17, wherein the plurality of software applications use the one or more relationships in the one or more configurations to provide a user-interface to a user, wherein the user-interface allows the user to manage specific instances of the relationships in the software applications.

22. The system of claim 17, wherein the one or more software applications use application-to-application communication to provide access to one or more of the modeled artifacts.

23. A machine-readable medium comprising instructions, which when executed by a machine, cause the machine to:
determine a meta-model;
choose one or more available artifacts to expose, the artifacts being available from a plurality of software applications, the plurality of software applications including a first software application and a second software application;
model the one or more chosen available artifacts using the meta-model;
receive the one or more modeled artifacts;
use the meta-model to define one or more relationships between the one or more modeled artifacts, wherein each relationship comprises a possible association defined in the meta-model, and wherein each relationship defines an aspect of a first artifact accessible via a second artifact of the one or more modeled artifacts, and wherein the first artifact is associated with the first software application and the second artifact is associated with the second software application; and
provide the one or more relationships to one or more of the plurality of software applications; and
define, during runtime of the first software application, a functional association between a software artifact of a first type corresponding to the first artifact of the modeled artifacts in the meta-model with a software artifact of a second type corresponding to the second artifact of the modeled artifacts in the meta-model using the possible association defined in the meta-model, wherein the software artifact of the first type is associated with the first software application and the software artifact of the second type is associated with the second software application.

* * * * *